Figures 1, 2:
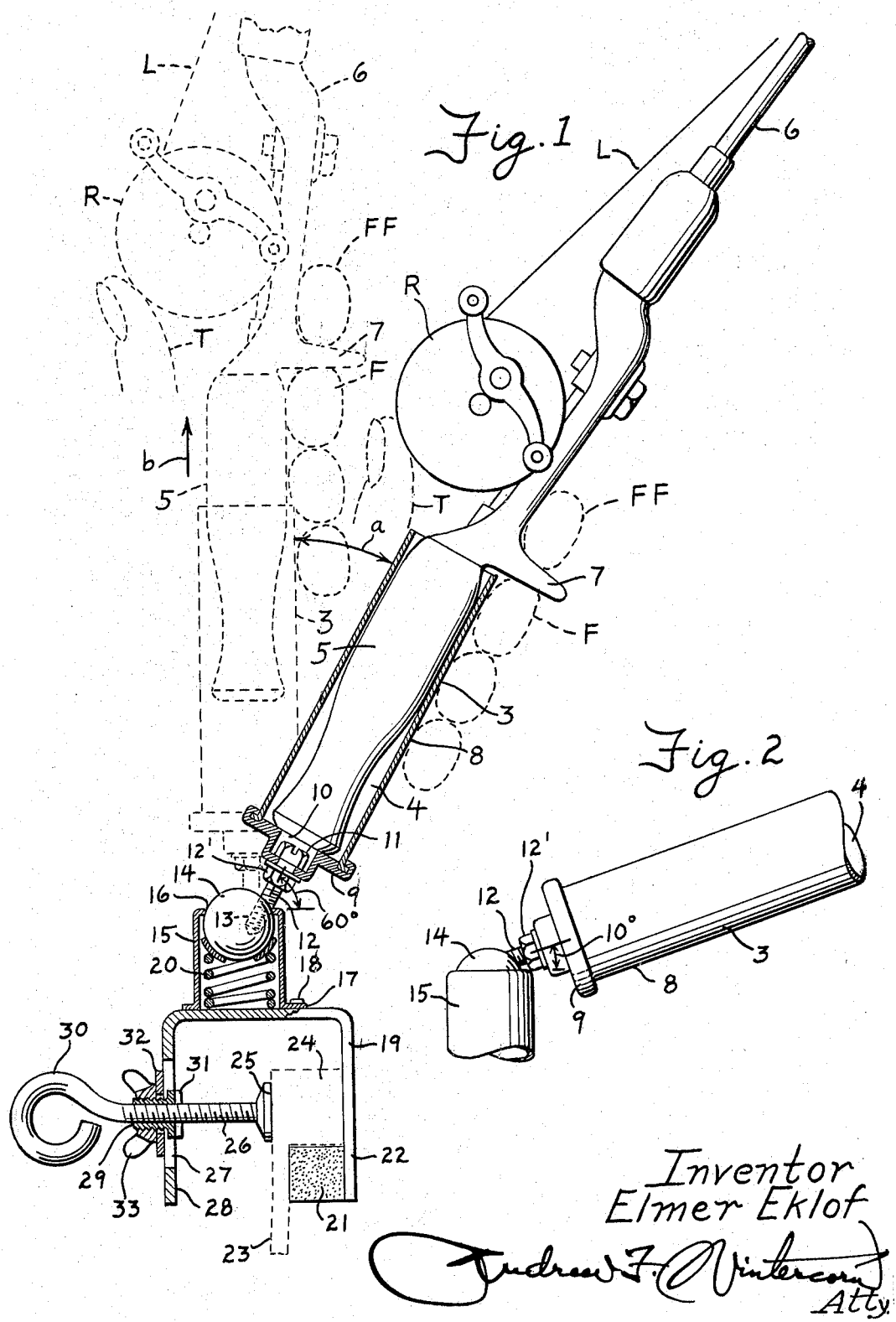

Dec. 13, 1966 — E. EKLOF — 3,290,816

FISHING POLE HOLDER

Original Filed Aug. 28, 1961

Inventor
Elmer Eklof
Atty.

United States Patent Office 3,290,816
Patented Dec. 13, 1966

3,290,816
FISHING POLE HOLDER
Elmer Eklof, 3226 Carolina Ave., Rockford, Ill.
Continuation of application Ser. No. 134,338, Aug. 28, 1961. This application May 13, 1965, Ser. No. 461,581
2 Claims. (Cl. 43—21.2)

This application is a continuation of my copending, now abandoned, application, Serial No. 134,338, filed August 28, 1961.

This invention relates to a new and improved holder for fishing poles and rods and has for its principal object the provision of a holder which, though holding the rod or pole securely enough, permits it to be jerked back and withdrawn from the holder easily in one motion the instant a fish is caught, whereby to avoid one of the most serious objections to holders previously devised, which were designed from the standpoint of secure holding to such a degree that they actually seriously interfered with the fisherman removing the rod speedily enough for good results. The present holder, on the other hand, holds the rod or pole securely enough without sacrificing the speed and facility of removal, which are so important for good results.

A salient feature of the fishing pole holder of my invention is the externally smooth, elongated tubular holder adapted to receive the handle portion of the pole, said tube being carried on a universally adjustable ball and socket mounting on the lower end thereof to permit an entirely different manner of operating the pole when a fish strikes. In this mounting, a stud projecting from the ball is disposed off-center to an appreciable extent, permitting setting the pole supporting tube at a 60° angle relative to the socket, for one extreme, down to an angle of about 10° for the other extreme, and, of course, for any other angle between those limits, by merely turning the ball in the socket by means of the tube, the ball being held under spring-pressure in any set position to retain that position until shifted or turned by hand to another position. The tube, which is only slightly larger in outside diameter than the handle on the pole, is smooth and devoid of shoulders internally and externally, so that the handle can be slipped out of the tube readily and the hand working the pole can also slip off the tube readily, thus permitting the operator to jerk back on the pole the instant a fish is caught and not run the risk of losing the fish due to any awkwardness in extricating the pole from the holder.

This invention is illustrated in the accompanying drawing, in which

FIG. 1 is a view partly in side elevation and partly in vertical section through a fishing pole holder made in accordance with my invention, showing the holder tube in full lines in section in the normal position and in dotted lines in a moved position comparable to the position assumed thereby in the handling of the pole when a fish is caught and the pole is jerked back and withdrawn from the holder in one motion, and FIG. 2 is a fragmentary side elevation illustrating the holder tube set at its smallest angle of about 10° with respect to the socket, in contrast to the setting of the tube at its largest angle of about 60° shown in full lines in FIG. 1.

The same reference numerals are applied to corresponding parts in these two views.

Referring to the drawing, the reference numeral 3 designates the tubular holder element of cylindrical form that is only slightly larger in outside diameter than the handle end of a fishing pole or rod so that it will fit easily in the operator's hand and has a smooth shoulderless cylindrical bore 4 to receive the butt or handle end 5 of a fishing pole or rod 6 with the conventional finger-engaging projection 7 projecting forwardly from the upper end of the tube 3, so that the operator in removing the pole can use this projection as a means of lifting the handle end 5 out of the tube, the tube having a smooth cylindrical exterior 8, devoid of any shoulders so that the hand engaging the projection 7 to lift the handle end 5 of the pole out of the tube 3 can slip over the outside of the tube freely and there will be nothing to interfere with the speedy removal of the handle end 5 from the tube.

The closed bottom 9 of the tube 3 is recessed as indicated at 10 to accommodate the head 11 of a stud 12 threaded in a hole 13 in a ball 14 offset from the center of the ball to an appreciable extent so that the stud 12 by its abutment on one side of the socket 15, in which the ball 14 is swivelled and universally pivotally adjustable, can support the tube 3 at any one of a large number of angles between the approximately 60° angle of FIG. 1 and the approximately 10° angle of FIG. 2, depending on what angle the operator wants between these limits and upon the kind of rod or pole being used and the kind of fishing being done. The socket 15 is of tubular form with a circular hole 16 in its upper end of slightly smaller diameter than the ball 14 and an annular flange 17 defined on the other end, where the socket is fastened by means of rivets 18 or the like to the top of the inverted U-shaped supporting bracket 19, compressing a coiled compression spring 20 between the ball 14 and the bracket 19 under sufficient load to afford the desired friction drag on the swivel and pivotal movement of the ball relative to the socket. The stud 12 is suitably held against turning with respect to the tube and locked by means of nut 12′, and is moreover tightened in the hole 13 enough to permit turning the ball 14 by means of the stud through the tube 3.

The supporting bracket 19 is of improved design, having a block 21 of rubber mounted on the inner side of the one leg 22 thereof for non-marring engagement with the outer side of the hull 23 of a boat below the gunwale 24 when the clamp 25 operated by the screw 26 adjustably mounted with respect to the vertical slot 27 in the other leg 28 of the bracket is tightened. The neck 29, in which the screw 26 is operable by means of the handle loop 30 on its outer end, is part of a slidable T-member 31 adjustable up or down inside the bracket 19 in slot 27 to the desired elevation to suit the boat on which the fishing pole holder is to be used, and a washer 32 surrounds the neck 29 on the outside of the bracket and is engaged by a wing-nut 33 threading on the outside of the neck 29 to clamp the T-member 31 in its adjusted position, so that the screw 26 can be loosened and tightened as many times as necessary without altering the vertical adjustment of the neck 29 with respect to the bracket 19.

In operation, the operator takes hold of the pole 6 and tube 3 as if the pole were standing in mid-air at the instant the fish strikes the bait, as clearly indicated by the thumb T and four fingers F indicated in dotted lines on the full-line showing in FIG. 1, where all but the forefinger FF encircle the tube 3 under the projection 7 on the handle end of the rod while the forefinger is engaged over the projection in the accustomed manner and the thumb T is disposed in the accustomed position bearing against the reel R to apply whatever braking action on the line L the occasion requires, the handle end 5 of the pole 6 being given a rearward and upward motion simultaneously, as indicated by the arrows $a$ and $b$, respectively, so that the fisherman winds up in a few seconds with the handle 5 in his graps as one after another of the fingers F slipping off the upper end of the tube 3, as indicated in the dotted line position in FIG. 1, come into holding contact with the handle 5. If, as sometimes happens, the fisherman is not quick enough to take over control of the pole at the instant the fish strikes, there is really no serious danger of the handle end 5 of the pole being pulled out of the tube 3, even if the tube 3 is set at its smallest angle, as shown in FIG. 2, because the pull on the line L is usually more in a downward direction with respect to the outer end of the pole 6 than in an outward direction, and even when the pull is in an outward direction, the chances are that the pull would not be sufficiently in line with the pole 6 and handle 5 to cause the handle 5 to slip out of the tube 3, because any downward pull or any downward and lateral pull on the line L will obviously cause the handle end 5 of the pole to get cocked in the tube 3 and accordingly bind enough to resist any outward pull component enough to prevent its slipping out, the bore 4 being only slightly larger in diameter than the handle ends of most poles or rods to make this kind of cocking action sufficiently effective. At any rate, most fishermen are alert enough to take hold of the handle end of the pole before any real danger arises of the handle 5 slipping out, and most fishermen would much rather have the advantage of having the pole as readily removable from the holder, as herein disclosed, even if there is a small risk of its possibly being pulled out under certain given special conditions, the principal objective being, of course, to catch fish, rather than to let a good fish get away by reason of the inability to extricate the pole quickly enough from the holder.

The degree of inclination of the tube 3 relative to the bracket 19, in the set position of the pole depends on how the ball 14 is turned with respect to the socket 15. The 10° position of FIG. 2 and 60° position of FIG. 1 are the opposite extremes, but the operator can select any angle between these extremes by merely turning the tube 3 in the full line position of FIG. 1 thereby turning the ball 14 in the socket 15 so that the stud 12 has abutment with the hole 16 in the socket at a different angle relative to the bracket 19.

It is believed the foregoing description conveys a good understanding of the objects and advantages of my invention. The appended claims have been drawn to cover all legitimate modifications and adaptations.

I claim:
1. A fishing rod holder comprising, in combination a supporting bracket, an elongated tubular holder adapted to receive and support the handle of a fishing rod and having a closed inner end and an open outer end in which to receive a fishing rod handle, a resiliently tensioned ball-joint fixed on said bracket, including a substantially vertical socket member of rigid construction having a ball swivelled and rotatable therein and projecting appreciably therefrom, and a rigid straight stud of small diameter in relation to the diameter of the exposed portion of the ball fixed thereto in eccentric relation to the center of the ball but substantially at right angles to a diametrical plane thereof and forming a rigid axial extension of the inner end of said holder for supporting said holder in eccentric relation to said ball, the extent of projection of the ball from the socket and the diameter of the stud in relation to the diameter of the exposed portion of the ball being such that in one extreme position of rotation of the ball the stud rigidly supports the holder in a steep angle of inclination by abutment with the adjacent side of the socket, and when the ball is turned to the other extreme position the stud rigidly supports the holder in a nearly horizontal position by abutment with the adjacent side of the socket, intermediate positions of the holder being obtainable by turning the ball with the stud to various positions between these two extremes.

2. A fishing rod holder as set forth in claim 1 in combination with a fishing pole or rod having an elongated handle portion and a finger-engaging projection on the upper end of the handle portion, the elongated tubular holder being of thin-walled rigid material, smooth on the outside and inside so as to provide a smooth bore therein in which substantially the full length of the fishing rod handle below the finger-engaging projection is closely received, so as to enable grasping both the elongated tubular holder and the handle end of the fishing rod in one hand, said finger-engaging projection extending laterally outwardly from said open end of said tubular holder to permit positioning of the index finger of said one hand above the aforesaid projection and the other fingers of the same hand below it for manual control of the fishing rod and removal of it from the holder when a fish is caught and the fishing rod must be removed quickly from the holder and handled independently of it.

References Cited by the Examiner

UNITED STATES PATENTS

| | | | |
|---|---|---|---|
| 2,548,351 | 4/1951 | Coombs | 248—42 |
| 2,694,538 | 11/1954 | Consolo et al. | 248—42 |
| 2,704,412 | 3/1955 | Davis | 43—21.2 |
| 2,713,741 | 7/1955 | Gnagy | 43—21.2 X |
| 2,893,644 | 7/1959 | Holden | 287—87 X |
| 3,186,736 | 6/1965 | Warshawsky | 287—87 X |

SAMUEL KOREN, *Primary Examiner.*

W. R. CAMP, *Assistant Examiner.*